W. B. HARSEL.
TIRE MAKING MACHINE.
APPLICATION FILED NOV. 3, 1917.

1,279,337.

Patented Sept. 17, 1918.
4 SHEETS—SHEET 1.

Inventor

William B. Harsel, by Rogers, Kennedy & Campbell
Attorneys

W. B. HARSEL.
TIRE MAKING MACHINE.
APPLICATION FILED NOV. 3, 1917.

1,279,337.

Patented Sept. 17, 1918.
4 SHEETS—SHEET 2.

Inventor
William B. Harsel

By Rogers, Kennedy & Campbell
Attorneys

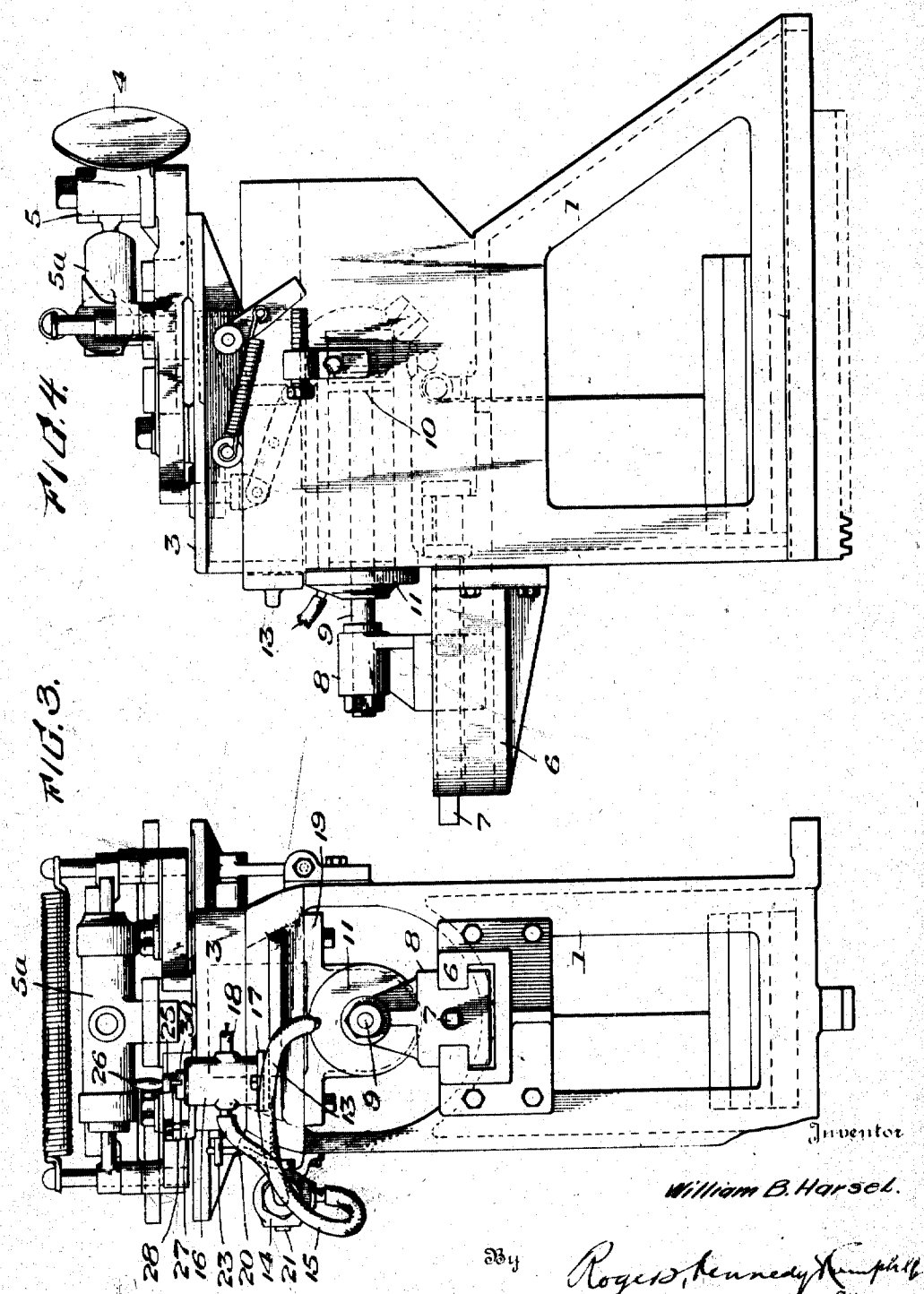

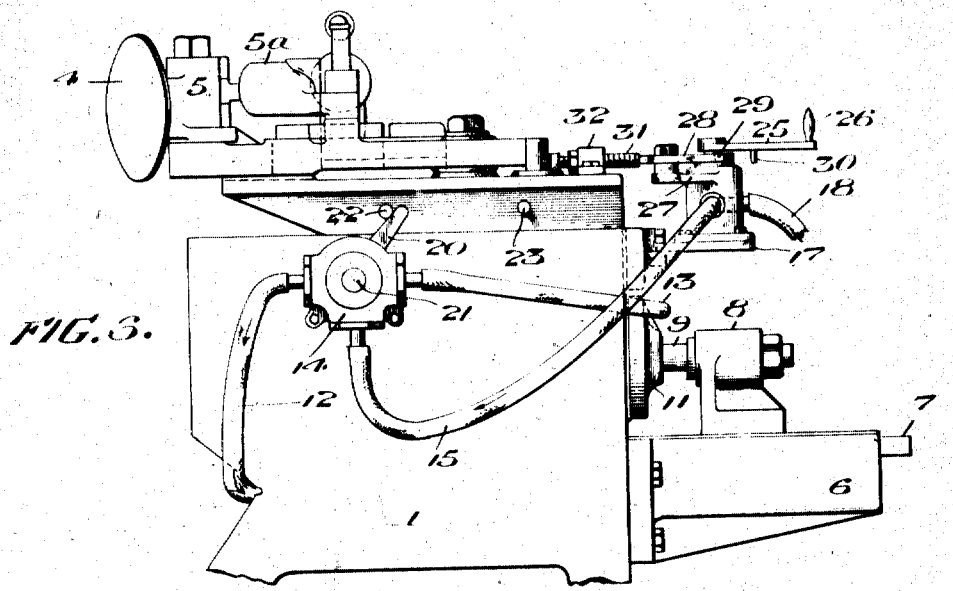

UNITED STATES PATENT OFFICE.

WILLIAM B. HARSEL, OF AKRON, OHIO, ASSIGNOR TO THE GOODYEAR TIRE & RUBBER COMPANY, OF AKRON, OHIO, A CORPORATION OF OHIO.

TIRE-MAKING MACHINE.

1,279,337.   Specification of Letters Patent.   Patented Sept. 17, 1918.

Application filed November 3, 1917. Serial No. 200,184.

*To all whom it may concern:*

Be it known that I, WILLIAM B. HARSEL, a citizen of the United States, residing at Akron, in the county of Summit and State of Ohio, have invented certain new and useful Improvements in Tire-Making Machines, of which the following is a specification, reference being had therein to the accompanying drawing.

This invention relates broadly to tire making machines, it has more especial reference to machines for forming "carcasses" (so-called) of pneumatic tires, and it includes certain novel instrumentalities for effecting predetermined and accurate movements of certain of the operating parts, whereby the machine is, in a large measure, rendered automatic.

One of the objects of the invention is to provide (in connection with the pressure-supporting carriage of the machine) a single actuating means for effecting both an advancing movement and a receding movement thereof in relation to a tire-form or core upon which the carcass is formed.

Another object of the invention is to provide (in connection with the aforementioned actuating means) mechanism for automatically arresting the carriage at a predetermined point in relation to the core, whereby the machine may operate in such manner as to reduce to a minimum any manual operation of its parts in comparison with the number that usually are necessary to be made by an attendant, in operating other types of machines, during a cycle of travel of the carriage thereof.

Still another object within the contemplation of the invention is to provide a single power-operated means for actuating the carriage alternately in opposite directions; first, for an advancing movement toward the tire-form or core and, then, (after the carriage shall have been automatically arrested by means thrown into action by the carriage itself) to effect its receding movement to starting position, the carriage being adapted, nevertheless, to operate with all necessary speed in synchronism with the speed of rotation of the core.

A more specific object of the invention, in one aspect thereof, is to provide a machine in which the presser-supporting carriage is actuated to travel toward and away from the tire-core by a single fluid-operated means, the operation thereof being effected automatically and in predetermined relation of the carriage to the core.

A further specific object of the invention, in another aspect thereof, is to provide a machine in which the single fluid-operated means is controlled by the carriage itself when the same shall have reached a predetermined position with respect to the core, whereby the carriage may be arrested and then, by the fluid-operated means, returned to starting position.

Other important objects and advantages are inherent in the structure and will be obvious from the appended drawings illustrative thereof, while the following specification will make clear other objects and advantages of the same.

I am aware that it is not broadly new to effect a feeding movement of a presser-supporting carriage toward a tire-form by pneumatic means; but I believe it to be entirely novel with us to provide a single fluid-operated mechanism for effecting the receding as well as advancing movement of the carriage, and to combine therewith means for arresting the carriage automatically at a predetermined stage in its advancing movement whereby the fluid-operated mechanism will temporarily be given a reverse movement to return the carriage to normal position. In machines with which I am familiar that employ pneumatic means for moving the carriage toward the tire-core, mechanism that is separate and dissimilar from the pneumatic means is utilized to return the carriage to starting position. A structure which includes these separate and independent mechanisms for advancing the carriage, and then for returning it to normal position, requires a construction that involves several instrumentalities which are entirely eliminated in a machine constructed in accordance with my invention. The consequent economies and efficiencies of my improved construction will, I believe, be self-evident.

In order that the invention may readily be comprehended, I have appended hereto drawings which show one embodiment thereof; it being understood, however, that these drawings are merely illustrative and that the structure therein revealed is susceptible of a wide range of modification and equivalency without departing from the principles or spirit of the invention.

In these drawings:

Fig. 2 is a view in top plan of the same;

Fig. 3 is a view in end elevation;

Fig. 4 is a view in side elevation thereof;

Fig. 5 is a view in vertical longitudinal section on the line 5—5, Fig. 2;

Fig. 6 is a fragmentary view, in elevation and more or less diagrammatic, showing especially the means for automatically arresting the advancing movement of the carriage;

Fig. 7 is a view in top plan, and more or less diagrammatic, showing the structure of Fig. 5; and Fig. 8 is a detail view, in section, of the fluid-controlling valve.

Figure 1:
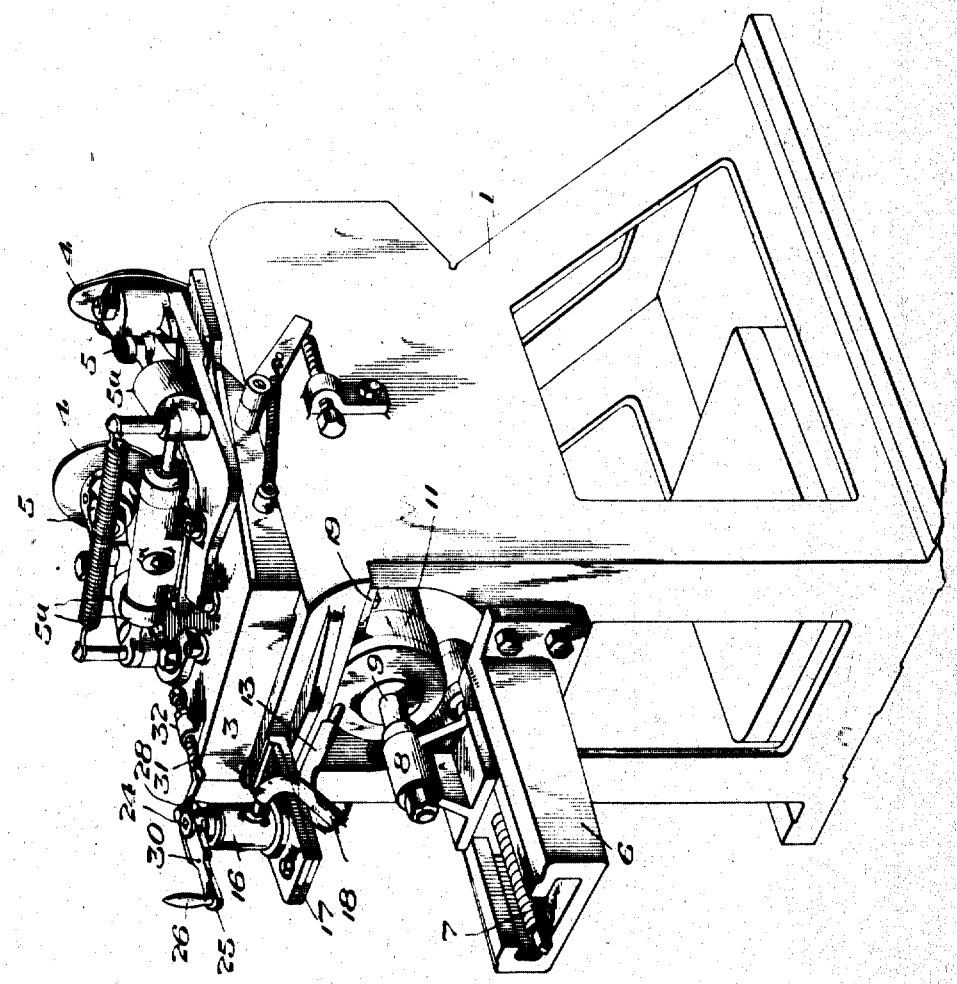
Figure 1 is a view in perspective of a carcass-making machine constructed in accordance with my invention.

*Base.*—In the drawings, the reference-character 1 designates a base or pedestal upon which the operating parts of my invention are supported. Jutaposed to this pedestal and mounted in relation thereto in any suitable manner, is a tire-form or core 2, the same being disposed for rotation at any required speed. Upon this core plies of fabric are laid and superposed to form the carcass, these plies being stretched and formed about the core by the forming mechanism now to be described.

*Carcass - forming mechanism.*—Mounted upon the base 1 and adapted to have a reciprocating movement thereon in respect to the core 2 is a presser-supporting carriage 3. Fabric - pressing members 4, arranged in spaced apart relation and adapted to move radially with respect to the axis of the core 2 and to have a movement relatively to each other and independent of the travel of the carriage, are sustained by the carriage 3 through positioning members 5. Any appropriate means for actuating these members 5 may be employed such, for instance, as those disclosed in a co-pending application filed in the joint names of William B. Harsel and Edward Nall, on the 3rd day of November, 1917, Serial No. 200,185, and which means, in this instance, preferably include pneumatic devices 5ª for effecting movement of the pressing members relatively to each other and independently of the traveling movement of the carriage, all as disclosed in said application. As this particular means, *per se*, for operating the members 5 constitutes no part of my present invention, a detail description thereof is now deemed unnecessary. It will suffice to explain that these means are controlled in such manner in respect to various stages of travel of the carriage 3 that the pressing-members 4 have movements that are timed in relation to the position of the carriage in respect to the core.

*Carriage-actuating mechanism.*—To actuate the carriage toward and from the core 2 in order to position the pressing-members 4 and move them along the surface of the same radially with respect to its axis, a single power-operated means is provided and comprises the following structure: Mounted on the front end of the base 1, and preferably below the plane of the carriage 3 is a supporting bracket 6 in which is disposed a threaded member 7 to which is movably connected an upstanding piston - support 8. By means of the threaded member 7 the support 8 may be adjusted in respect to the front face of the base 1.

Carried by the support 8 is a piston 9 having a piston-head 10 adapted to operate in a cylinder 11 into which fluid under pressure is to be introduced. Any appropriate pressure-fluid may be employed, and any suitable means for introducing it into the cylinder 11 may be utilized. As the structure which I have devised contemplates the introduction of such fluid into the cylinder alternately at opposite sides of the piston-head 10, I have illustrated herein, as a practical means for supplying the fluid to the cylinder 11, a pipe 12—which introduces the fluid into the rear end of the cylinder—and a pipe 13 which is adapted to introduce the fluid into its front end. The pipes 12 and 13 are joined in a valve-device 14, into which also extends a pipe 15 connected with a motor valve-device 16 on a bracket 17, and into which leads a supply-pipe 18, this, in turn, connecting with any suitable source of supply of fluid under pressure. The valve-device 14 controls the admission of pressure-fluid into the cylinder 11, while the master valve-device 16 controls the feed of the pressure-fluid to the valve-device 14. When the pressure-fluid enters, by the pipe 13, into the forward end of the cylinder 11, the piston 9 is actuated and, by reason of its connection (through the connecting piece 19) with the carriage 3, will cause the latter to advance toward the axis of the core 2. When the carriage has reached a predetermined position and is arrested—in the manner presently to be explained—the valve-device is automatically operated to cut off the flow of fluid through the pipe 13, the fluid then being permitted to pass through the pipe 12 into the rear end of the cylinder to effect a receding movement of the piston and, thus, of the carriage. In this way, and by this single power-operated means, the carriage is caused to advance and recede in respect to the core.

*Carriage - arresting mechanism.*—When the carriage reaches a predetermined position in respect to the surface of the core—and this is usually when the pressing-members 4 have traversed, and operated to press, the fabric up to a point adjacent the inner portion of the core—it is desirable to arrest its advancing movement so that it may be automatically returned to starting position: In the present embodiment, this is accomplished by the following structure, which is designed to coöperate with the valve-device 14 so that the same may be actuated to cut off the flow of pressure-fluid through the pipe 13 into the forward end of the cylinder 11 and then to permit the fluid to pass through the pipe 12 into the rear end of the cylinder, whereby the carriage is first stopped and then moved back to starting position. To this end, the valve is provided with an actuating arm 20 fast on the stem 21. The pressure-fluid, which is admitted through the pipe 15 into the valve 14 may be directed, according to the setting of the valve 14, either through the pipe 12 or the pipe 13. If directed through the latter, the carriage is advanced; whereas, if directed through the pipe 12, a receding movement of the carriage is effected. It is, therefore, desirable to arrange for the setting of this valve automatically by the carriage, itself, so that the carriage may control the valve. For this purpose, the carriage carries two pins or posts 22 and 23, Figs. 2, 3 and 6. Engagement of the arm 20 by the pin 22 throws the valve to direct the fluid through the pipe 13; whereas engagement of the arm by the pin 23 actuates the valve to direct the pressure-fluid through the pipe 12. It will now be apparent that as the valve 14 is controlled by the carriage, the latter, once having begun its cycle of operation, would (unless controlled in some way) continue to advance and recede because, as soon as the carriage has returned and the valve 14 is re-set to close the pipe 12, the pressure-fluid would be admitted to the pipe 13 and the carriage would then be moved in the opposite direction. To control this action, however, the master valve-device 16 is provided so that the feed of the pressure-fluid into the valve 14 may be controlled and the machine stopped and started at the will of the operator. The valve 16 is manually set by the operator, and for this purpose the following structure is provided: Fast on a stem 24 of the valve 16 is an arm 25 provided with a handle 26. Mounted on the valve 16 is a second arm 27. At the extremity of the arm 27 is pivoted a small bell-crank lever 28, one arm of which is provided with a hook 29 adapted to engage a pendant pin 30 on the arm 25 when the same shall have been moved by the operator to the dotted-line position indicated in Fig. 7 from the full-line position shown in the same figure. The opposite end of the lever 28 is adapted to engage with an abutment-member which is shown, in this instance, as an adjustable screw 31 threaded through a bracket 32 on the carriage 3. It will be understood that when the operator shall have moved the arm 25 to the dotted-line position, Fig. 7, the locking lever 28 will hold the arm in that position. After the carriage shall have reached the end of its advancing movement and recedes to its starting position, the abutment or trip member 31 engages the bell-crank lever 28 and swings the same on its pivot, whereupon the arm 25 is released and may then be swung by the operator to its full-line position, which closes the master valve 16. As a result, the flow of pressure-fluid into the pipe 15 is shut off so that no fluid may then enter the valve 14. Consequently, the carriage, being then at its starting position, remains there until the operator opens the valve 16 by swinging the arm 25 to its dotted-line position. This permits the flow of pressure-fluid into the valve 14 so that such fluid may pass through the pipe 13 into the cylinder to initiate the advancing movement of the carriage, as already explained. While the valve 16 is open, the valve 14 is operative to control the advancing and receding movements of the carriage.

It will now be obvious that, in my improved structure, a single means including a pressure-fluid mechanism, for actuating the carriage for its advancing and receding movements in respect to the core, is provided; and, in addition, independent fluid-pressure means are likewise provided for actuating the fabric-pressers 4 in respect to the core but independent of the travel of the carriage.

From the foregoing, it will be perceived that I have devised a simple but very effective and efficient structure, comprising comparatively few parts, and all constituting a single power-operated means, for effecting the two required movements of the carriage in respect to the core, combined with means for automatically arresting the carriage in its travel.

What I claim is:

1. A tire-making machine including in combination, a base, a carriage movably supported thereon, a fluid-operated device active on the carriage to effect its movement in at least two directions, and controllable means for supplying a pressure-fluid to said device.

2. A tire-making machine including in combination, a base, a tire-core juxtaposed thereto, a carriage on the base and adapted to travel in relation to the core, a fluid-operated device operative on the carriage to effect both its advancing and its receding movement in relation to the core and including a piston and cylinder coöperating to actuate the carriage, and means controllable at the will of the operator for supplying a pressure-fluid to said device.

3. A tire-making machine including in combination, a base, a tire-core juxtaposed thereto, a carriage on the base, a single fluid-operated device reversible automatically for effecting the travel of the carriage on the base in two directions in respect to the core, and means controllable at the will of the operator for supplying a pressure-fluid to said device.

4. A tire-making machine including in combination, a base, a tire-core juxtaposed thereto, a carriage adapted to travel on the base in relation to the core in at least two directions, a pneumatic device operative on the carriage to effect its advancing movement toward the core and also its receding movement away from the same, and manually and automatically controlled means for actuating said device to set it in action.

5. A tire-making machine including in combination, a base, a tire-core juxtaposed thereto, a presser-supporting carriage adapted to travel on the base in relation to the core, a single power operated, reversible device including pressure fluid actuated mechanism operative on the carriage to effect both its advancing and its receding movement in relation to the core, and means for automatically arresting the carriage at a point in predetermined relation to the core.

6. A tire-making machine including in combination, a base, a tire-core juxtaposed thereto, a presser-supporting carriage adapted to travel on the base in relation to the core in at least two directions, a single fluid-operated device operative on the carriage to effect both its advancing and its receding movement in relation to the core, manually and automatically controlled means for supplying a pressure-fluid to the device, and means controlled by the carriage for automatically arresting the same at a point in predetermined relation to the core.

7. A tire-making machine including in combination, a base, a carriage adapted to have a cycle of travel in two directions in relation to the core, fabric pressing devices mounted on and movable with the carriage, automatic means operated during an advancing movement of the carriage for arresting the same at a point in predetermined relation to the core, and a single power operated means including pressure fluid actuated mechanism for effecting such advancing movement of the carriage toward the core and, after said carriage has been arrested, for effecting its receding movement therefrom.

8. A tire-making machine including in combination, a tire-core, a carriage adapted to have a cycle of travel in at least two directions with respect to the core, fabric-presser devices connected to the carriage and movable therewith in relation to the core, and actuatable independently of the carriage with respect to the core, pressure-fluid operated means for actuating the presser-devices, a pressure-fluid operated device for effecting a traveling movement of the carriage in respect to the core, and controllable means for supplying a pressure-fluid to said device.

9. A tire-making machine including in combination, a tire-core, a carriage adapted to have a cycle of travel in at least two directions with respect to the core, fabric-presser devices connected to the carriage and movable therewith in relation to the core and actuatable independently of the carriage with respect to the core, pneumatic means for actuating the presser-devices, an independent pneumatic means for effecting an advancing movement of the carriage toward the core and a receding movement therefrom, and means controllable at the will of the operator for automatically supplying a pressure-fluid to each of said pneumatic means.

10. A tire-making machine including in combination, a tire-core, a carriage having a cycle of travel in at least two directions in respect to the core, fabric-presser devices oppositely disposed with respect to the periphery of the core and carried by and movable with the carriage, fluid-operated means for actuating the presser-devices in relation to the core, fluid-operated means independent of the presser-device actuating means for effecting a two-way travel of the carriage in respect to the core, instrumentalities for independently supplying a pressure-fluid to each of said pneumatic means, means for automatically arresting the carriage during its advancing movement, and means controllable at the will of the operator for governing the travel of said carriage in either direction.

11. A tire-making machine in combination, a tire-core, a carriage having a two-way travel in respect to the core, a fluid-operated device for actuating the carriage both toward and away from the core, means for supplying a pressure fluid to said device, a controlling device for said fluid-operated device, and means connected to the carriage and adapted to operate said controlling device.

12. A tire-making machine including a tire-core, a base juxtaposed to the core, a carriage adapted to have a two-way travel on the base in respect to the core, a fluid-pressure cylinder juxtaposed to the carriage and having a plurality of ports, a piston working in the cylinder and connected to the carriage, means for introducing a pressure-fluid alternately at opposite sides of the piston to effect an advancing movement of the carriage toward the core and, then, a receding movement of the carriage away from the core, and means for controlling the flow of fluid into the cylinder.

13. A tire-making machine including a tire-core, a base juxtaposed to the core, a carriage adapted to have a two-way travel on the base in respect to the core, a fluid-pressure cylinder juxtaposed to the carriage and having a plurality of ports, a piston working in the cylinder and connected to the carriage, means for introducing a pressure-fluid alternately at opposite sides of the piston to effect an advancing movement of the carriage toward the core and, then, a receding movement of the carriage away from the core, and means operated by the carriage for controlling the flow of the fluid into the cylinder.

14. A tire-making machine including a tire-core, a base juxtaposed to the core, a carriage adapted to have a two-way travel on the base in respect to the core, a fluid-pressure cylinder juxtaposed to the carriage and having a plurality of ports, a piston working in the cylinder and connected to the carriage, means for introducing a pressure-fluid alternately at opposite sides of the piston to effect an advancing movement of the carriage toward the core and, then, a receding movement of the carriage away from the core and means operated by the carriage for controlling the flow of the fluid into the cylinder and including a valve, an actuating-element carried thereby, and a device carried by the carriage and adapted to operate said actuating element.

15. A tire-making machine including a tire-core, a base juxtaposed to the core, a carriage adapted to have a two-way travel on the base in respect to the core, a fluid-pressure cylinder juxtaposed to the carriage and having a plurality of ports, a piston working in the cylinder and connected to the carriage; means for introducing a pressure-fluid alternately at opposite sides of the piston to effect an advancing movement of the carriage toward the core and, then, a receding movement of the carriage away from the core, and means operated by the carriage for controlling the flow of the fluid into the cylinder and including a valve having a plurality of ports, an acuating-element connected thereto and having a swinging movement thereon, and a device on the carriage and normally unconnected to the element and positionable by the carriage into engagement therewith to swing the same and thereby close the valve against flow of a fluid through one port and open it for flow of the fluid through another of the ports.

In testimony whereof, I have affixed my signature in presence of two witnesses.

WILLIAM B. HARSEL.

Witnesses:
R. S. TROGNER,
B. J. McDANEL.